(12) United States Patent
Newstrom et al.

(10) Patent No.: US 7,552,008 B2
(45) Date of Patent: Jun. 23, 2009

(54) POPULATING GEOSPATIAL DATABASE FOR ONBOARD INTELLIGENT VEHICLE APPLICATIONS

(75) Inventors: Bryan J. Newstrom, Circle Pines, MN (US); Max Donath, St. Louis Park, MN (US); Craig R. Shankwitz, Minneapolis, MN (US)

(73) Assignee: Regents of the University of Minnesota, St. Paul, MN (US)

(*) Notice: Subject to any disclaimer, the term of this patent is extended or adjusted under 35 U.S.C. 154(b) by 1133 days.

(21) Appl. No.: 10/197,273

(22) Filed: Jul. 17, 2002

(65) Prior Publication Data

US 2003/0023614 A1    Jan. 30, 2003

Related U.S. Application Data

(60) Provisional application No. 60/306,248, filed on Jul. 18, 2001.

(51) Int. Cl.
    *G06F 17/00* (2006.01)
(52) U.S. Cl. .............. 701/207; 707/104.1; 340/988; 382/210
(58) Field of Classification Search .......... 701/1, 701/96, 301, 207; 342/165; 340/988, 902, 340/903, 435, 444, 441, 467, 465; 180/170, 180/282; 404/94; 707/104.1, 100; 382/210
See application file for complete search history.

(56) References Cited

U.S. PATENT DOCUMENTS

| | | | | |
|---|---|---|---|---|
| 4,120,566 A | | 10/1978 | Sanci et al. ............... 350/302 |
| 4,406,501 A | | 9/1983 | Christensen ................ 305/10 |
| 5,059,061 A | * | 10/1991 | Stenemann et al. .......... 404/72 |
| 5,203,923 A | * | 4/1993 | Hartman .................... 118/669 |
| 5,214,757 A | | 5/1993 | Mauney et al. ............. 395/161 |
| 5,231,379 A | | 7/1993 | Wood et al. ................ 340/705 |

(Continued)

FOREIGN PATENT DOCUMENTS

EP    1 096 229 A1    3/2000

(Continued)

OTHER PUBLICATIONS

Office Communication for U.S Appl. No. 10/626,953, filed Feb. 12, 2004, date of mailing: Jan. 3, 2006.

(Continued)

*Primary Examiner*—Tuan C To
(74) *Attorney, Agent, or Firm*—Westman, Champlin & Kelly, P.A.

(57) ABSTRACT

The present invention is an apparatus and a method for populating a geospatial road database. In accordance with one embodiment of the invention, a geospatial database management system is mounted on a host vehicle and manages geospatial data relating to a travel path for the host vehicle. The embodiment further comprises a geospatial database to store data elements indicative of objects and their location. The embodiment further comprises a database manager component to maintain the geospatial database and receive database queries from a driver assist subsystem. The embodiment further comprises a database developer component is configured to develop the data elements in the geospatial database and receive database inputs from a lane level digitizer subsystem configured to receive inputs from a plurality of sensors mounted on the host vehicle. Finally, the embodiment comprises the plurality of sensors may include a Digital Global Positioning System, a digital camera, and a scanning range sensor. The present invention includes a method for implementing the steps performed by the embodiment of the apparatus.

35 Claims, 13 Drawing Sheets

U.S. PATENT DOCUMENTS

| | | | |
|---|---|---|---|
| 5,291,338 A | 3/1994 | Bezard et al. | 359/859 |
| 5,381,338 A | 1/1995 | Wysocki et al. | 364/449 |
| 5,414,439 A | 5/1995 | Groves et al. | 345/7 |
| 5,444,442 A | 8/1995 | Sadakata et al. | 340/916 |
| 5,497,271 A | 3/1996 | Mulvanny et al. | 359/631 |
| 5,499,325 A | 3/1996 | Dugan, Jr. | 395/132 |
| 5,517,419 A | 5/1996 | Lanckton et al. | 364/449 |
| 5,529,433 A * | 6/1996 | Huynh et al. | 404/94 |
| 5,540,518 A * | 7/1996 | Wambold | 404/84.05 |
| 5,543,789 A | 8/1996 | Behr et al. | 340/995 |
| 5,599,133 A * | 2/1997 | Costello et al. | 404/72 |
| 5,602,741 A * | 2/1997 | Talbot et al. | 701/213 |
| 5,652,705 A | 7/1997 | Spiess | 344/436 |
| 5,721,685 A * | 2/1998 | Holland et al. | 701/207 |
| 5,734,358 A | 3/1998 | Sumiyoshi | 345/7 |
| 5,761,630 A | 6/1998 | Sekine et al. | 701/301 |
| 5,765,116 A | 6/1998 | Wilson-Jones et al. | 701/41 |
| 5,808,566 A | 9/1998 | Behr et al. | 340/995 |
| 5,826,212 A | 10/1998 | Nagai | 701/208 |
| 5,848,373 A | 12/1998 | DeLorme et al. | 701/200 |
| 5,872,526 A | 2/1999 | Tognazzini | 340/961 |
| 5,910,817 A * | 6/1999 | Ohashi et al. | 348/159 |
| 5,926,117 A | 7/1999 | Gunji et al. | 340/988 |
| 5,930,474 A * | 7/1999 | Dunworth et al. | 709/217 |
| 5,934,822 A * | 8/1999 | Green | 404/94 |
| 5,949,331 A | 9/1999 | Schofield et al. | 340/461 |
| 5,951,620 A | 9/1999 | Ahrens et al. | 701/200 |
| 5,953,722 A | 9/1999 | Lampert et al. | 707/100 |
| 5,966,132 A | 10/1999 | Kakizawa et al. | 345/419 |
| 5,978,737 A | 11/1999 | Pawlowski et al. | 701/301 |
| 5,999,635 A | 12/1999 | Higashikubo et al. | 382/104 |
| 5,999,878 A | 12/1999 | Hanson et al. | 710/208 |
| 6,035,253 A | 3/2000 | Hayashi et al. | 701/211 |
| 6,038,496 A | 3/2000 | Dobler et al. | 701/3 |
| 6,038,559 A | 3/2000 | Ashby et al. | 707/4 |
| 6,047,234 A | 4/2000 | Cherveny et al. | 701/200 |
| 6,049,295 A | 4/2000 | Sato | 340/928 |
| 6,104,316 A | 8/2000 | Behr et al. | 340/995 |
| 6,107,944 A | 8/2000 | Behr et al. | 340/995 |
| 6,120,460 A | 9/2000 | Abreu | 600/558 |
| 6,122,593 A | 9/2000 | Friederich et al. | 701/202 |
| 6,144,335 A | 11/2000 | Rogers et al. | 342/357.03 |
| 6,157,342 A | 12/2000 | Okude et al. | 342/357.13 |
| 6,161,071 A | 12/2000 | Shuman et al. | 701/48 |
| 6,166,698 A | 12/2000 | Turnbull et al. | 343/713 |
| 6,184,823 B1 | 2/2001 | Smith et al. | 342/357.13 |
| 6,188,957 B1 | 2/2001 | Bechtolsheim et al. | 701/209 |
| 6,192,314 B1 | 2/2001 | Khavakh et al. | 701/209 |
| 6,196,845 B1 | 3/2001 | Streid | 434/44 |
| 6,208,927 B1 * | 3/2001 | Mine et al. | 701/70 |
| 6,208,934 B1 | 3/2001 | Bechtolsheim et al. | 701/209 |
| 6,212,474 B1 | 4/2001 | Fowler et al. | 701/211 |
| 6,218,934 B1 | 4/2001 | Regan | 340/438 |
| 6,226,389 B1 | 5/2001 | Lemelson et al. | 382/104 |
| 6,249,742 B1 | 6/2001 | Friederich et al. | 701/202 |
| 6,253,151 B1 | 6/2001 | Ohler et al. | 701/208 |
| 6,268,825 B1 * | 7/2001 | Okada | 342/357.13 |
| 6,272,431 B1 | 8/2001 | Zamojdo et al. | 701/211 |
| 6,278,942 B1 | 8/2001 | McDonough | 701/210 |
| 6,289,278 B1 | 9/2001 | Endo et al. | 701/208 |
| 6,297,516 B1 | 10/2001 | Forrest et al. | 257/40 |
| 6,298,303 B1 | 10/2001 | Khavakh et al. | 701/209 |
| 6,308,177 B1 | 10/2001 | Israni et al. | 707/100 |
| 6,314,365 B1 | 11/2001 | Smith | 701/200 |
| 6,314,367 B1 | 11/2001 | Ohler et al. | 701/208 |
| 6,343,290 B1 * | 1/2002 | Cossins et al. | 707/10 |
| 6,361,321 B1 | 3/2002 | Huston et al. | 434/69 |
| 6,370,261 B1 * | 4/2002 | Hanawa | 382/104 |
| 6,370,475 B1 | 4/2002 | Breed et al. | 701/301 |
| 6,381,603 B1 | 4/2002 | Chan et al. | 707/10 |
| 6,385,539 B1 | 5/2002 | Wilson et al. | 701/213 |
| 6,405,132 B1 | 6/2002 | Breed et al. | 701/301 |
| 6,438,491 B1 | 8/2002 | Farmer | 701/301 |
| 6,486,856 B1 | 11/2002 | Zink | 345/7 |
| 6,498,620 B2 * | 12/2002 | Schofield et al. | 348/148 |
| 6,526,352 B1 | 2/2003 | Johnson et al. | 701/213 |
| 6,587,778 B2 | 7/2003 | Stallard et al. | 701/117 |
| 6,650,998 B1 | 11/2003 | Rutledge et al. | 701/211 |
| 6,674,434 B1 | 1/2004 | Chojnacki et al. | 345/428 |
| 6,681,231 B1 * | 1/2004 | Burnett | 707/104.1 |
| 6,690,268 B2 | 2/2004 | Schofield et al. | 340/438 |
| 6,771,068 B2 * | 8/2004 | Dale et al. | 324/307 |
| 2001/0013837 A1 * | 8/2001 | Yamashita et al. | 340/988 |
| 2001/0024596 A1 * | 9/2001 | Sanfilippo et al. | 404/94 |
| 2001/0056326 A1 * | 12/2001 | Kimura | 701/208 |
| 2002/0029220 A1 * | 3/2002 | Oyanagi et al. | 707/101 |
| 2002/0036584 A1 | 3/2002 | Jocoy et al. | 342/70 |
| 2002/0105438 A1 * | 8/2002 | Forbes et al. | 340/901 |
| 2002/0174124 A1 * | 11/2002 | Haas et al. | 707/100 |
| 2002/0184236 A1 | 12/2002 | Donath et al. | 707/104.1 |
| 2003/0128182 A1 | 7/2003 | Donath et al. | 345/156 |
| 2004/0066376 A1 | 4/2004 | Donath et al. | 345/169 |
| 2006/0095193 A1 * | 5/2006 | Nishira et al. | 701/96 |

OTHER PUBLICATIONS

Development of Driving Support System for Patrol Under Poor Visibility—Evaluation of First Pilot Model-, pp. 1-7, Nov. 19, 2003.

"See the Road Ahead," GPS—Augmented Reality Aids Drivers, Nov. 1, 2003, by: Stephen Scott-Young, GPS World (14 pages).

Office Communication dated Oct. 4, 2003 for U.S. Appl. No. 10/091,182, filed Mar. 5, 2002, for First Named Inventor Max Donath.

Office Communication for U.S. Appl. No. 09/618,613, filed Jul. 18, 2000, dated Dec. 12, 2003.

Office Communication from U.S. Appl. No. 09/618,613, filed Jul. 18, 2000. Date of Office Communication Feb. 6, 2004.

Course Notes, "Programming with Open GL: Advanced Techniques," $24^{th}$ International Conference on Computer Graphics and Interactive Techniques, pp. 1-3, 83-102, 1997.

Office Communication for U.S. Appl. No. 09/968,724, filed Oct. 1, 2001, dated mailed Mar. 29, 2004.

Office Communication for U.S. Appl. No. 09/618,613, filed Jul. 18, 2000, date mailed: May 17, 2004.

Office Communication from U.S. Appl. No. 10/091,182 filed Mar. 5, 2002. Date of Office Communication May 21, 2004.

Office Communication for U.S. Appl. No. 09/968,724, filed Oct. 1, 2001, date mailed: Dec. 1, 2004.

U.S. Appl. No. 09/618,613, filed Jul. 18, 2000.

"Autonomous Vehicle using WADGPS," Daljit Singh and Harkirat Kaur Grewal, Ph.D., pp. 370-375, Proceedings of the Intelligent Vehicles '95 Symposium, Sep. 25-26, 1995.

Preston, Howard; Storm, Richard; Donath, Max; and Shankwitz, Craig, Review of Minnesota's Rural Intersection Crashes: Methodology for Identifying Intersections for Intersection Decision Support (IDS), Mn/DOT Final Report MN/RC-2004-31, 2004.

Najm, W.J.; J.A. Koopmann and D.L. Smith. "Analysis of Crossing Path Crash Countermeasure Systems." Proceedings of the $17^{th}$ International Technical Conference on the Enhanced Safety of Vehicles, Amsterdam, The Netherlands. Jun. 2001.

Chovan, J.D.; L. Tijerina; J.A. Pierowica; and D.L. Henricks. "Examination of Unsignalized Intersection Straight Crossing Path Crashes and Potential IVHS Countermeasures," Report DOT HS 808 152, DOT-VNTSC-NHTSA-94-2. Volpe National Transportation Systems Center, Washington, D.C., Aug. 1994.

Menon, Arvind; Gorjestani, Alec; Shankwitz, Craig; and Donath, Max. "Roadside Range Sensors for Intersection Decision Support," Proceedings of the 2004 IEEE ITS Conference (ITSC 2004), Washington, D.C., Oct. 2004.

U.S. Appl. No. 11/009,941, filed Dec. 10, 2004, entitled "Intersection Assistance System and Method".

Office Communication for U.S. Appl. No. 09/968,724, filed Oct. 1, 2002. Date of Mailing: Jun. 5, 2006.

Office Communication for U.S. Appl. No. 11/009,941, filed Dec. 10, 2004. Date of Mailing: Jul. 13, 2006.

Office Communication for U.S. Appl. No. 10/626,953, filed Feb. 12, 2004. Date of Mailing: Jul. 17, 2006.

Office Communication for U.S. Appl. No. 10/969,806, filed Dec. 20, 2004. Date of Mailing: Sep. 18, 2006.

* cited by examiner

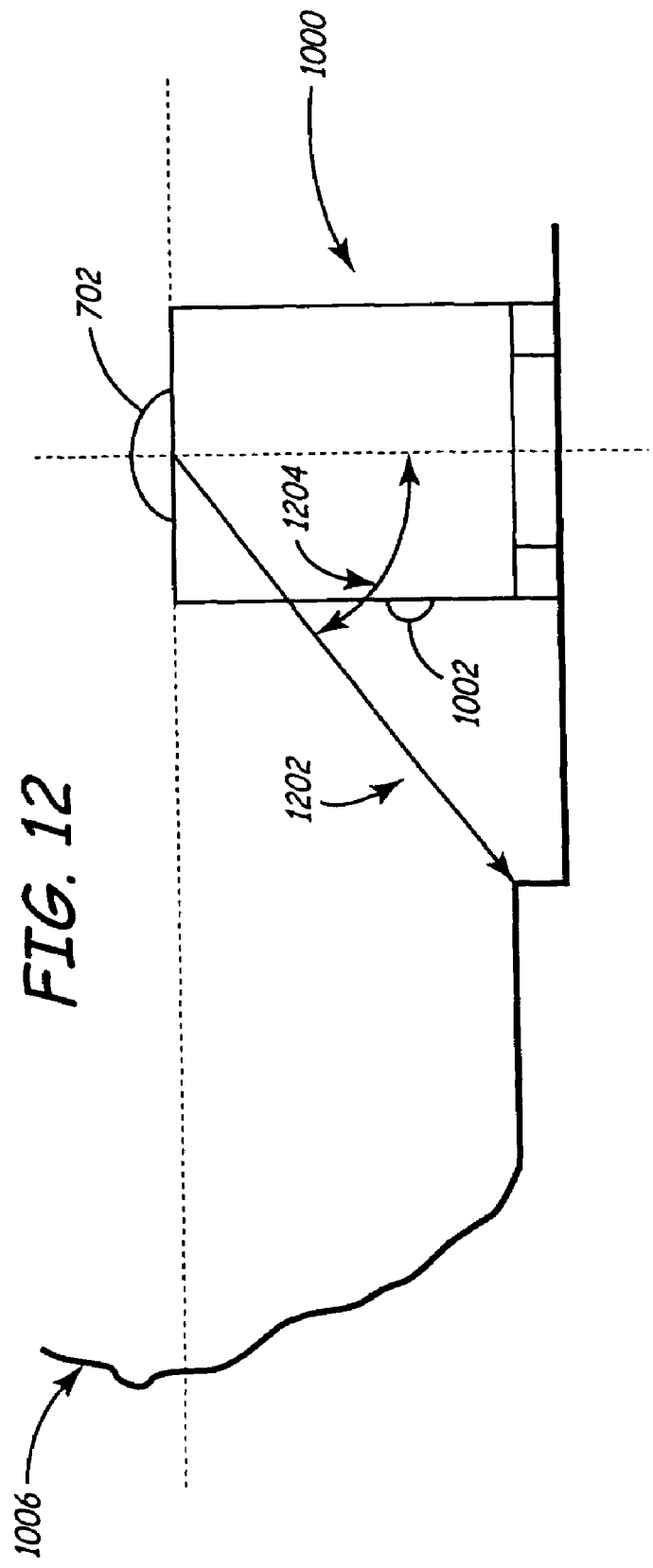

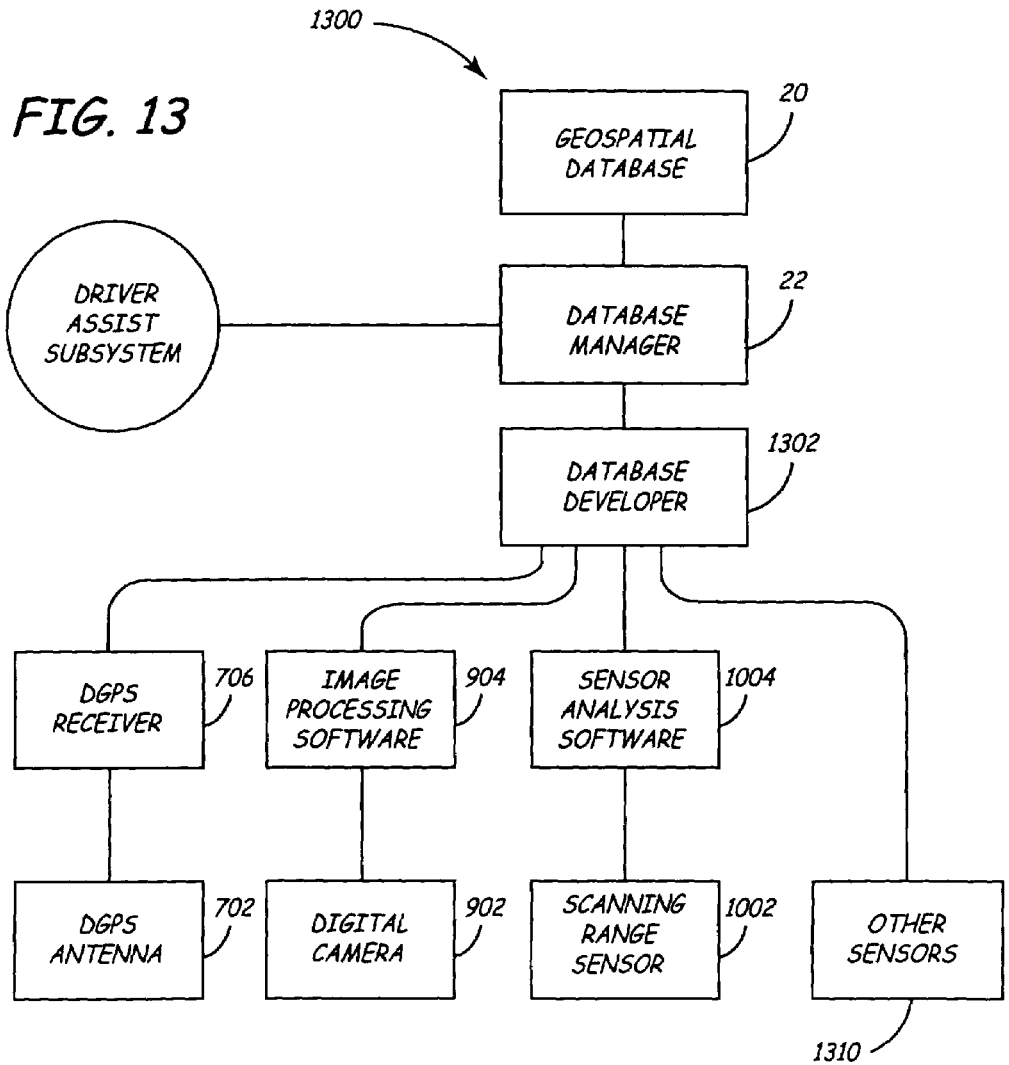

POPULATING GEOSPATIAL DATABASE FOR ONBOARD INTELLIGENT VEHICLE APPLICATIONS

CLAIM OF PRIORITY AND INCORPORATION BY REFERENCE

The present application is based on and claims the benefit of U.S. provisional patent application Ser. No. 60/306,248, filed Jul. 18, 2001, entitled POPULATING GEOSPATIAL ROAD DATABASE, the content of which is hereby incorporated by reference in its entirety.

The present application also claims priority of U.S. patent application Ser. No. 10/091,182, filed Mar. 5, 2002, entitled REAL TIME HIGH ACCURACY GEOSPATIAL DATABASE FOR ONBOARD INTELLIGENT VEHICLE APPLICATIONS, the content of which is hereby incorporated by reference in its entirety.

The present application also claims priority of U.S. patent application Ser. No. 09/618,613, filed Jul. 18, 2000, entitled MOBILITY ASSIST DEVICE, the content of which is hereby incorporated by reference in its entirety.

The present application also claims priority of U.S. patent application Ser. No. 09/968,724, filed Oct. 1, 2001, entitled VIRTUAL MIRROR, the content of which is hereby incorporated by reference in its entirety.

BACKGROUND OF THE INVENTION

The present invention relates to a driver assist system. More specifically, the present invention relates to populating a real time accessible geospatial database that can be used with driver assist subsystems.

Geographic information systems (GIS) are systems that are used to store and manipulate geographic data. GIS is primarily used for collection, analysis, and presentation of information describing the physical and logical properties of the geographic world. A system referred to as GIS-T is a subset of GIS that focuses primarily on the transportation aspects of the geographic world. There have been many products developed that provide drivers with route and navigation information. Some automobile manufacturers provide onboard navigation systems.

However, these systems are based on conventionally designed and commonly used digital maps that are navigatable road network databases, covering various geographic regions. Such maps are designed for turn-by-turn, and door-by-door route guidance which can be used in conjunction with a global positioning system (GPS) unit and a display for providing route assistance to a driver.

Such conventionally designed digital maps usually refer to digital road networks that are typically set up to do routing, geocoding, and addressing. In a road network, every intersection in a map is a node and the links are the roads connecting the nodes. There are also intermediate nodes that define link (road) geometry. These systems tend to employ a linear referencing system—that is, the location of nodes are defined relative to other nodes, and intermediate attributes are defined relative to a distance from a node (e.g., the speed limit sign is 5 miles along this specified road/link starting from this specified intersection/node).

Some existing maps have been adapted to assist onboard "intelligent" vehicle systems. For example, an autonomous van with computer controlled steering, throttle, brakes and direction indicators has been developed. The lateral guidance for the van was aided by knowledge of road curvatures stored in a digital road map database. Cameras were positioned to look at various angles away from the van. The road geometry was used to determine which camera would have the best view of the road for driving.

Another autonomous vehicle control was augmented with a digital map as well. In that instance, video cameras, ultrasonic sensors and a three-dimensional scanning laser range finder were used along with a differential GPS system to control and navigate an autonomous vehicle. A three-dimensional map was used to compensate for the inaccuracies of the DGPS system.

Similarly, digital road map databases have been used to help in collision avoidance. The map databases were used to detect when the vehicle was approaching an intersection and to provide the angles of adjoining roadways to aim radar.

Similarly, a digital railway map has been used in the field of positive train control. The map was similar to a road network database and was used to calculate braking distances and make enforcement decisions for automatic brake control of a train.

All of the above-described systems discuss the use of conventionally designed digital road maps to augment the workings of onboard vehicle systems. However, they are limited to the simple road network information in conventional digital maps, augmented with a small amount of additional information.

Existing digital road network databases, although becoming more prevalent, simply do not have adequate resolution, accuracy or access times for intelligent vehicle applications whether developed for real time driver assistant technologies or for autonomous vehicle control systems. For example, in European and Japanese urban areas, map scales for route guidance and map matching may need to be 1:10,000, while in rural areas, the map scales may only need to be 1:50,000. The urban areas require a higher resolution since the infrastructure density is greater.

However, the map scale needed for a real time driver assist system approaches 1:1—that is, what is in the database must substantially exactly correspond to what is in the real world.

SUMMARY OF THE INVENTION

The present invention relates to populating a geospatial road database which addresses the above problems.

The present invention is an apparatus and a method for populating a geospatial road database. The embodiment comprises populating a geospatial database configured to store data elements indicative of objects and a location of the objects in three-dimensional space. The database is populated so a database manager component can maintain the data elements in the geospatial database and receive database queries from a driver assist subsystem configured to assist a driver of the host vehicle.

In one embodiment, a database developer component is configured to develop the data elements in the geospatial database and receive database inputs from a lane level digitizer subsystem configured to receive inputs from a plurality of sensors mounted on the host vehicle. The plurality of sensors may include one of a variety of inputs, such as a Digital Global Positioning System, a digital camera, and a scanning range sensor. The present invention can be implemented as a method of performing the steps performed by the apparatus.

These and various other features as well as advantages which characterize the present invention will be apparent upon reading the following detailed description and review of the associated drawings.

BRIEF DESCRIPTION OF THE DRAWINGS

FIG. 12 illustrates the vertical scan results from FIG. 10 in accordance with one embodiment of the present invention.

FIG. 13 is a block diagram of a system for populating a geospatial road database in accordance with one embodiment of the present invention.

DETAILED DESCRIPTION OF THE PREFERRED EMBODIMENTS

The present invention relates to a system and method for populating a geospatial database. Before describing the system in detail, one exemplary geospatial database and some of its exemplary uses will be described for the sake of clarity.

Figure 1:
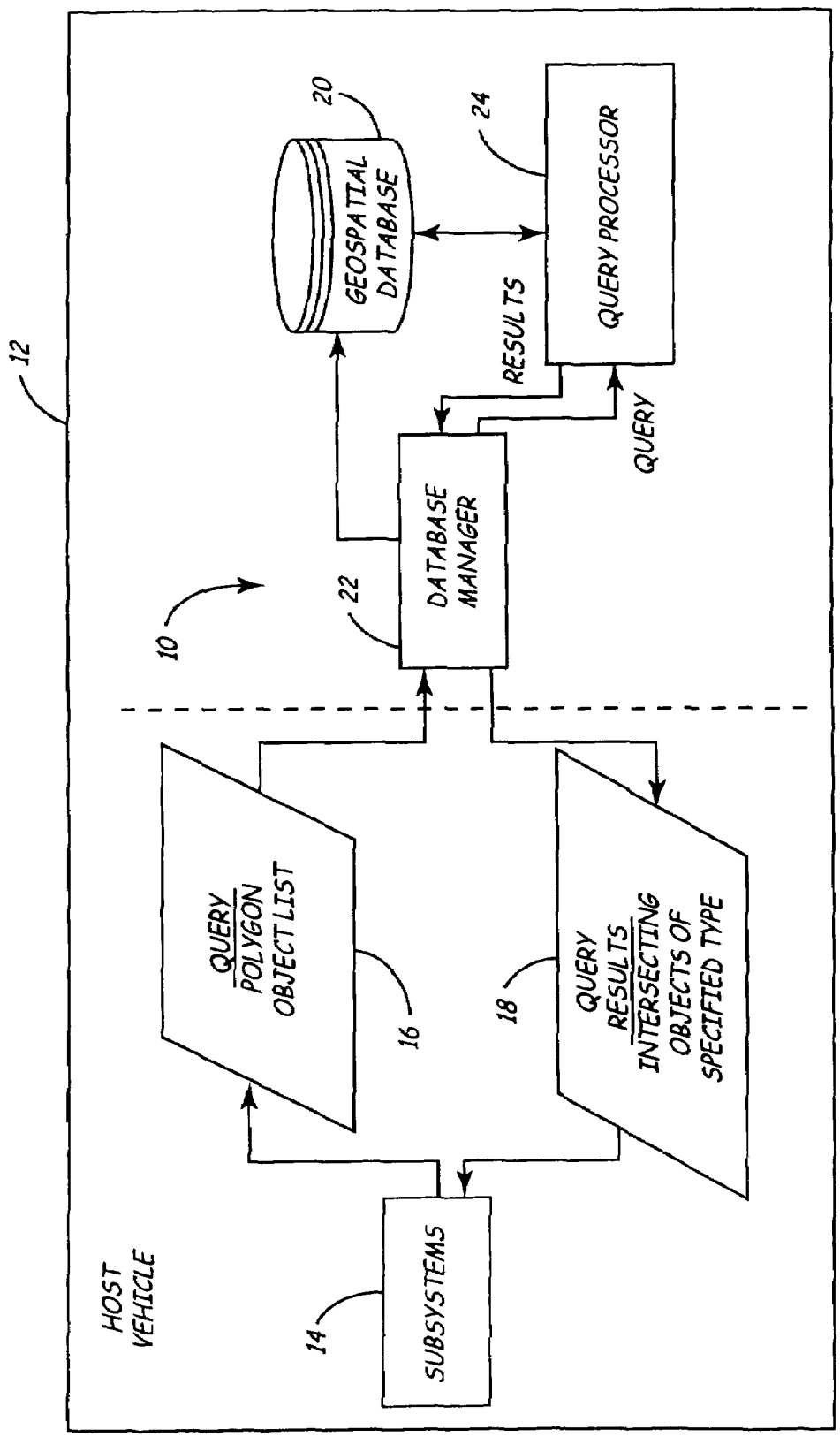
FIG. 1 is a block diagram of a geospatial database management system in accordance with one embodiment of the present invention.

FIG. 1 is a block diagram of a geospatial database management system 10 to be used on a host vehicle 12 with one or more onboard intelligent subsystems 14 (such as driver assist subsystems e.g: Collision avoidance and warning subsystem, lane keeping assist subsystem, platooning assist subsystems, vision enhancement or augmentation.) Subsystems 14 illustratively assist the driver of vehicle 12 in a variety of different ways. By way of example, subsystems 14 may provide an operator interface which conveys information to the operator indicative of the position of vehicle 12 within a lane of traffic, and also indicate to the driver information about objects around the vehicle.

In order to convey that information to the user, subsystems 14 provide a query 16 to database management system 10 and receive query results 18. The query results can indicate the location and attributes of a wide variety of objects relative to vehicle 12.

While the present invention does not depend on the particular type of subsystem 14 being used, a number of those subsystems will now be described in a bit greater detail to enhance understanding of the present invention. In one embodiment, subsystems 14 include a head-up display and radar filter that work together to create a virtual representation of the views out the windshield that allow the operator to safely maneuver the vehicle in impaired or low visibility conditions. Subsystems 14 can also include a virtual mirror or other vision assist system that creates a virtual representation of views looking in different directions from vehicle 12. Subsystems 14 also illustratively include a virtual rumble strip that provides a haptic feedback through the steering wheel, brake pedals, the seat, etc. to give the operator a sense of the vehicle position within a current lane.

The road information used by each of these subsystems is illustratively maintained in a geospatial database 20 by a database manager 22. The information is retrieved from geospatial database 20, through database manager 22, by query processor 24.

Some specific examples of subsystems 14 will now be discussed for the sake of clarity only. The head-up display is described in greater detail in U.S. patent application Ser. No. 09/618,613. Briefly, however, the head up display provides a vehicle operator with a virtual roadway view when the view of the real road is impaired or blocked. This system works by creating a computer-generated image of the current lane boundaries as seen through the windshield from the driver's eye perspective. In one embodiment, the operator looks through a combiner, which is a spherical semi-reflective semi-transmissive piece of optical ground and coated glass or optical grade plastic, that combines the computer-generated image and the actual view out the windshield. The head-up display subsystem is calibrated so that the virtual roadway overlays the real roadway.

The radar filtering subsystem is also described in greater detail in the above-identified patent application. Briefly, however, the subsystem works in conjunction with the head-up display. Radar is mounted on vehicle 12 to detect objects in a vicinity of vehicle 12. When the radar detects an object, it passes the location of the object to the head-up display which then draws an icon to represent that object in the correct location and size to overlay the object. Due to the size of the field of view of the radar system, the radar may detect signs, trees and other objects that are either off the road surface or pose no threat of collision. To reduce the number of detected objects to display, known objects that do not pose a threat are filtered and not displayed to the driver. The objects that are filtered out are usually off the road, beyond the road shoulder, in a traffic island, or in a median. Filtering is performed by comparing the location of detected objects to the road geometry in the same region. If the filter determines that the detected objected is on the roadway or shoulder, then the head-up display displays an icon to represent the detected object. Objects on the shoulder are presented within the head-up display since they may present an abandoned vehicle or other potential obstacle to the driver.

The virtual rumble strip generates haptic feedback that provides a "feel" of the road to the driver by imposing, for example, a reactive torque as a function of positional change relative to the road geometry. Thus, for example, the lane boundary can be made to feel like a virtual wall or hump, which the driver must overcome in order to change lanes. This subsystem can simulate the action of a real rumble strip. As the vehicle moves toward either lane boundary, to the left or the right of the vehicle, the steering wheel can oscillate as if the vehicle is driving over a real rumble strip. The process controlling a servo motor (that imparts the oscillation and is attached to the steering wheel shaft) first determines the lateral offset between the vehicle's position and the center of the current lane. Once the lateral offset crosses a preset limit, the motor oscillates the steering wheel. Of course, unlike a physical rumble strip, the virtual rumble strip can change the amount of "rumble" as the vehicle moves. Thus, as the operator drifts further from the center line, the virtual rumble strip may increase oscillation giving the operator a sense of which direction to steer back to the center of the lane.

The objects or data types that are used within geospatial database 20 are modeled on actual road infrastructure. Together, the different data types comprise the data model that defines the objects within the database, and how the different objects relate to one another. Since each of the different subsystems 14 require different information about the same stretch of roadway, the data model can be tailored to the particular subsystems 14.

In one illustrative embodiment, all data types are based on four basic spatial data types, but not limited to four: point, line-string, arc-segment and polygon. The most basic spatial type is the point, and all other spatial types are comprised of points. All points include three-dimensional location data, such as either an X, Y and Z component or latitude, longitude, and elevation components. Line-strings are a list of points that represent continuous line segments, and arc-segments are line-strings that represent a section of a circle. Any arc includes a series of points that lay on a circle, with a given center point. A polygon is a closed line string with the first and last points being the same.

Direction is an important component of road information. Direction has been captured by the ordering of the points within the spatial objects. The direction of any road object is defined by the direction of traffic, and is captured by its spatial representation. In other words, the first point within the object is the first point reached while driving and the second point is the second point reached, and so on, while moving in the normal direction of traffic. This encoded order makes the direction inherent in the object and removes the need to store the direction as an attribute outside of the spatial data.

Each of the onboard subsystems 14 has specific data types that represent the data it needs. Included with each data type are attributes that identify other non-spatial properties. To simplify the objects within the database, their non-spatial attributes are illustratively specific for their spatial data type. Within geospatial database 20, all the attribute processing is done during the database creation process. If an attribute changes along a spatial object, then the original object is illustratively split into two smaller objects keeping the attributes static.

In one illustrative embodiment, included within the line-string based objects are attributes that can be used to reconstruct continuous line-string segments from its parts. Using these attributes, the original line-string can be reconstructed from the line-string segments that were split off due to attribute changes. Each new component line-string has an identification (ID) number that uniquely identifies that line-string within a unique group. All line-strings that make up a larger line-string are part of the same group. Within geospatial database 20, each line-string based object is uniquely identified by its group and ID within that group. Also included is a previous ID and a next ID that are attributes which describe how each individual line-string fits into the larger line-string, or what the next and previous line-strings are.

Figure 2:
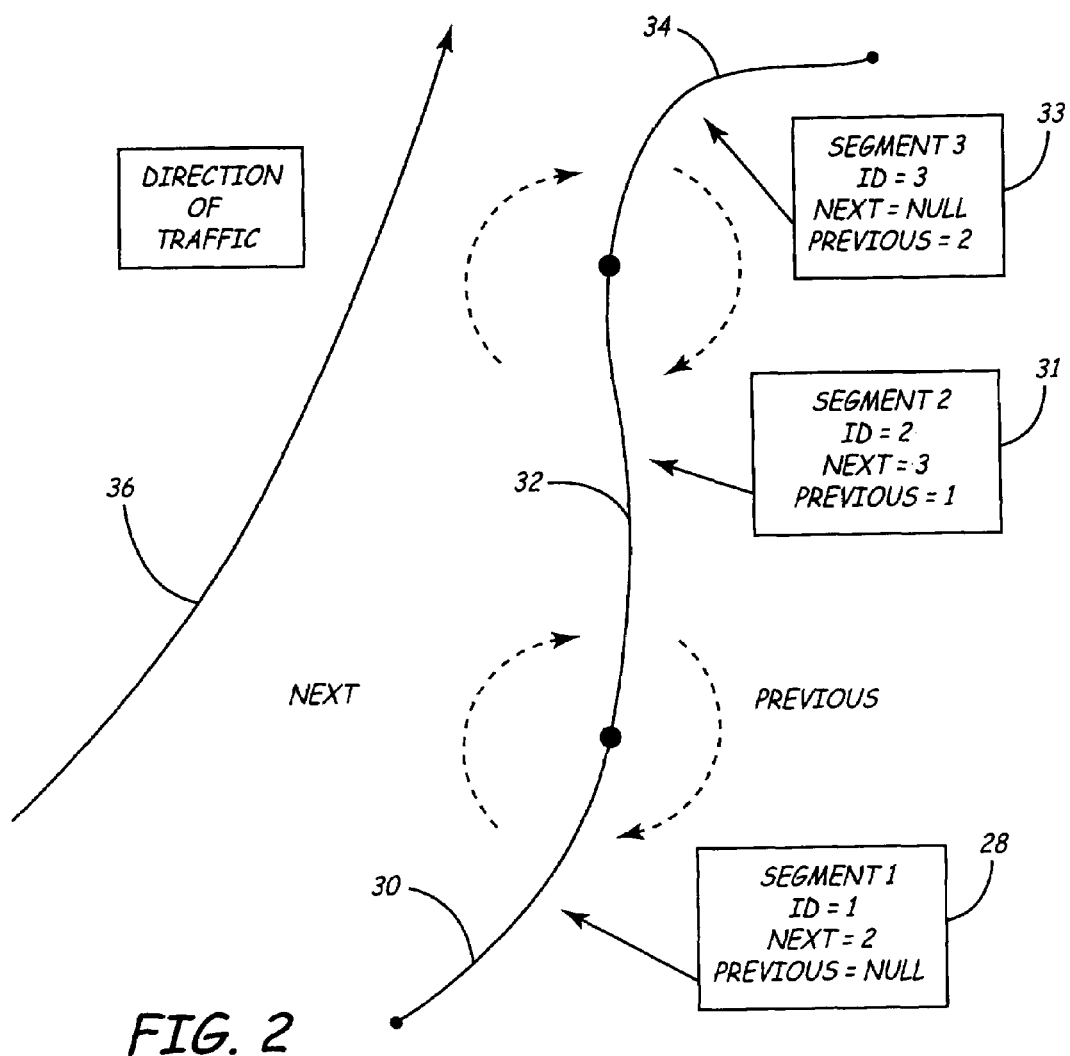
FIG. 2 illustrates how some data types are modeled in accordance with one embodiment of the present invention.

FIG. 2 is a depiction of such line-string based objects. FIG. 2 shows three line-string segments 30, 32 and 34. Such segments, when joined together as shown in FIG. 2, may illustratively represent a road boundary, center line, etc., with a direction of traffic generally indicated by arrow 36. FIG. 2 also illustrates the objects 28, 31 and 33 corresponding to segments 30, 32 and 34, with their associated attributes. The attributes, for example, include a segment number, an ID, a next line segment in the group, and a previous line segment in the group. It can thus be seen how the line segments can be reassembled to make one single line segment corresponding to the segments of a single group.

A number of specific data types will now be discussed for the previously-mentioned subsystems 14, for exemplary purposes only. It will, of course, be understood that a wide variety of other data types can be stored in geospatial database 20 as well.

The head-up display may illustratively include a LaneBoundary data type and a calibration mark (CalMark) data type. The LaneBoundaries are the left and right most limits to each individual lane and may correspond to the painted lane markings to the right and left of a lane. The head-up display projects the LaneBoundaries correctly so that they overlay the actual lane markings.

The LaneBoundary object is based on the line-string spatial data type. Each LaneBoundary is between two lanes, a lane to the right and a lane to the left, where left and right is relative to the direction of traffic. The direction property of the LaneBoundary is captured within its attributes.

Figure 3:
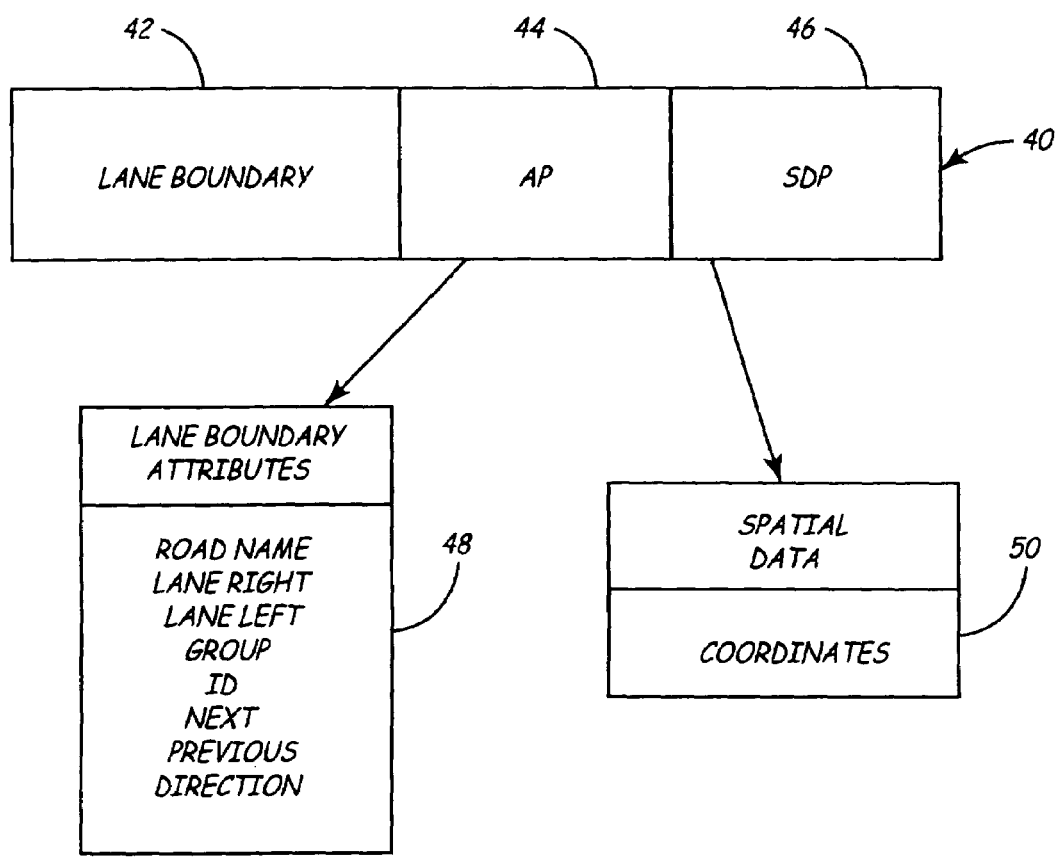
FIG. 3 illustrates one model for representing objects in the database in accordance with one embodiment of the present invention.

FIG. 3 illustrates a LaneBoundary object, and one illustrative way that it is organized within geospatial database 20. In one illustrative embodiment, the LaneBoundary object includes a first entry 40 in database 20 which has an object type identifier section 42 that identifies the object type, along with a pair of pointer sections 44 and 46. Pointer 44 illustratively contains an attributes pointer (AP) that points to a location within geospatial database 20 that contains the attributes 48 associated with the LaneBoundary object identified by identifier 42. Pointer 46 illustratively contains a spatial data pointer (SDP) that points to a location within geospatial database 20 that contains the spatial data 50 corresponding to the LaneBoundary object identified by identifier 42. The spatial data, as discussed above, will illustratively include X, Y and Z coordinates or longitude, latitude and elevation coordinates, or any other coordinates that identify the location of the particular object referred to.

The attributes 48 may also include the name and direction of the roadway of which the LaneBoundary is a part, wherein the direction attribute refers to the overall compass direction which may, for example, be included in the road name such as the "West" in "Interstate 94 West". This means that the object is found in the West bound lane or lanes of Interstate 94. Of course, it is also possible to add attributes to the object that describe the actual lane marking applied to the roadway (e.g., double line, single and skip line, yellow or white colored lines, etc.) following acceptable lane marking standards.

The head-up display subsystem 14 may also include the CalMark object that is used during calibration of the head-up display. Normally, these represent simple geometric figures painted on the roadway and are based on the line-string data type. The attributes may illustratively include a unique ID number and the name of the road with which it is associated with. The CalMark object may not be needed during operation of the system.

The radar filtering subsystem 14 illustratively includes a RoadShoulder object and a RoadIsland object, while the virtual rumble strip subsystem 14 illustratively includes a LaneCenter object. RoadShoulders are illustratively defined as the boundary of any driveable surface which corresponds to the edge of pavement and may correspond to any painted stripes or physical barrier. The target filter uses this object to determine whether detected objects are on the road surface. RoadShoulders are based on the line-string data type and can be on one or both sides of the roadway, which is captured by an attribute. Table 1 shows one embodiment of the attributes of the RoadShoulder object.

TABLE 1

RoadShoulder

Road Name
Group
Id
Next
Previous
Direction
Side

RoadIslands are areas contained within RoadShoulders, or within the roadway, that are not driveable surfaces. Once the radar target filter has determined that an object is on the road, or between the RoadShoulders, then the filter compares the location of the detected object against RoadIslands to determine whether the object is located within a RoadIsland, and thus can be ignored. Table 2 shows illustrative attributes of the RoadIsland object.

TABLE 2

RoadIsland

Road Name
Id

LaneCenters are defined as the midpoint between the LaneBoundaries of the lane. The virtual rumble strip computes a lateral offset from the LaneCenter to be used for determining when to oscillate the steering wheel for undesired lane departure. The individual segments of a LaneCenter object can, for example, either be a straight line or a section of a circle. Each LaneCenter object captures the properties of a single lane, including direction and speed limit. Table 3 illustrates attributes of a LaneCenter object.

TABLE 3

LaneCenter

Road Name
Lane
Group
Id
Next
Previous
Direction
Speed

It can be seen that, within the attributes for the LaneCenter object, there is a unique lane number that is the same number used within the LaneBoundaries, and there are also left and right attributes.

Warnings of lane departure such as the use of steering wheel vibrations or oscillations can also be determined by other more complex algorithms, such as the Time to Lane Crossing (TLC) approach, where parameters used in the algorithm are determined from the vehicle's speed, position and orientation relative to the LaneCenter, or relative to the RoadShoulder, or relative to the Lane Boundaries attribute, or relative to any new attribute or one identified relative to these, and from the steering wheel or steered wheel angle.

It should also be noted that many other objects could also be used. For example, such objects can be representative of mailboxes, jersey barriers, guard rails, bridge abutments, tunnel walls, ground plane and ceiling, curbs, curb cutouts, fire hydrants, light posts, traffic signal posts, sign and sign posts, pavement edge, dropoff and other structures adjacent to the road or pathway, as needed. Furthermore, each object may have a drawing attribute or set of attributes that describe how to draw it in a display. These objects may be produced from sensor inputs or from calculations based on sensor inputs.

Of course, it should also be noted that these data types are specific to vehicles traveling on roads. Other data types will be used in other applications such as aircraft or other vehicles traveling on an airport tarmac or in the air, vehicles travelling on or under the water, construction equipment, snowmobiles, or any of the other applications mentioned in the incorporated references.

It will be appreciated from the description of subsystems 14, that each of them needs to continually update the geospatial database information received from system 10 to accommodate vehicle motion. As vehicle 12 moves, the field of view of each subsystem 14 changes and the information previously retrieved from geospatial database 20 is no longer valid.

In database management system 10, database manager 22 and query processor 24 work together to provide access to the road information stored within geospatial database 20. Database manager 22 maintains the database and is a gateway to query processor 24.

Figure 4:
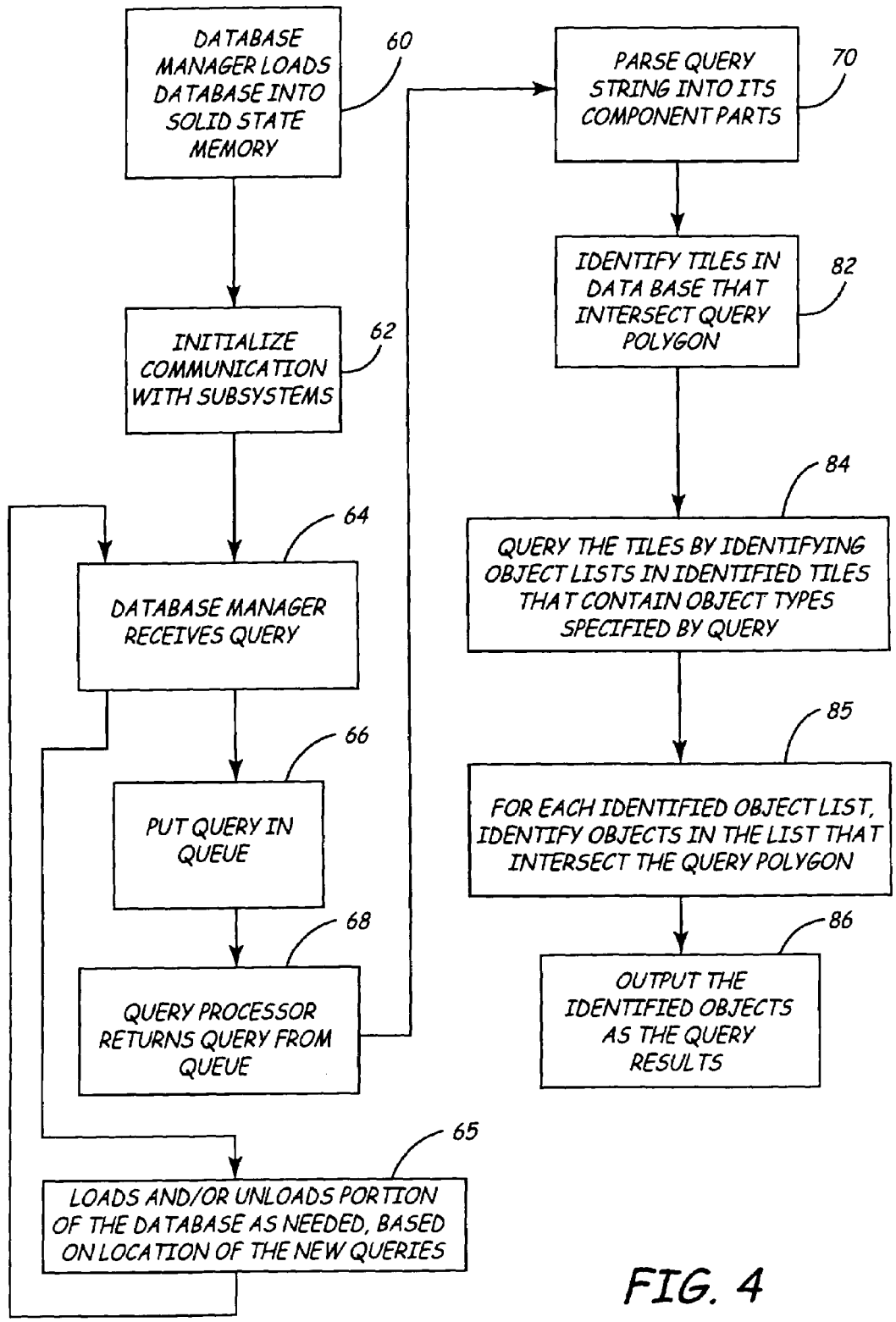
FIG. 4 is a flow diagram illustrating the operation of the system shown in FIG. 1 in accordance with one embodiment of the present invention.

FIG. 4 is a flow diagram that better illustrates the operation of the system. When database manager 22 is first initialized, it loads database 20 (from a CD, DVD, hard disk, wireless connection to server, etc.) into solid state memory. Of course, it should be noted that, where database 20 is extremely large, database manager 22 can simply load a relevant portion of the database into solid state memory, such as a portion of the database corresponding to a 50 mile radius around a current geographic location. Loading the database into memory is indicated by block 60 in FIG. 4. It should also be noted that the Database Manager can unload unused portions and load new portions as the location of the queries change. This is exemplified by block 65 in FIG. 4.

Database manager 22 then initializes communication with subsystems 14. This is indicated by block 62. Database manager 22 then simply waits for a query 16 to arrive from subsystem 14.

In generating a query 16, each of the subsystems 14 provide a predefined query structure. The query structure illustratively contains a query polygon and a character string describing the desired object types with desired attributes or attribute ranges. The query polygon is the area of interest (such as the area around or in front of vehicle 12) to the particular subsystem generating the query. Database manager 22 receives the query as indicated by block 64 and places the query in a query queue as indicated by block 66. When query processor 24 is ready to process the next query, it retrieves a query from the query queue as indicated by block 68, and parses the query into its component parts, as indicated by block 70.

Figure 5:
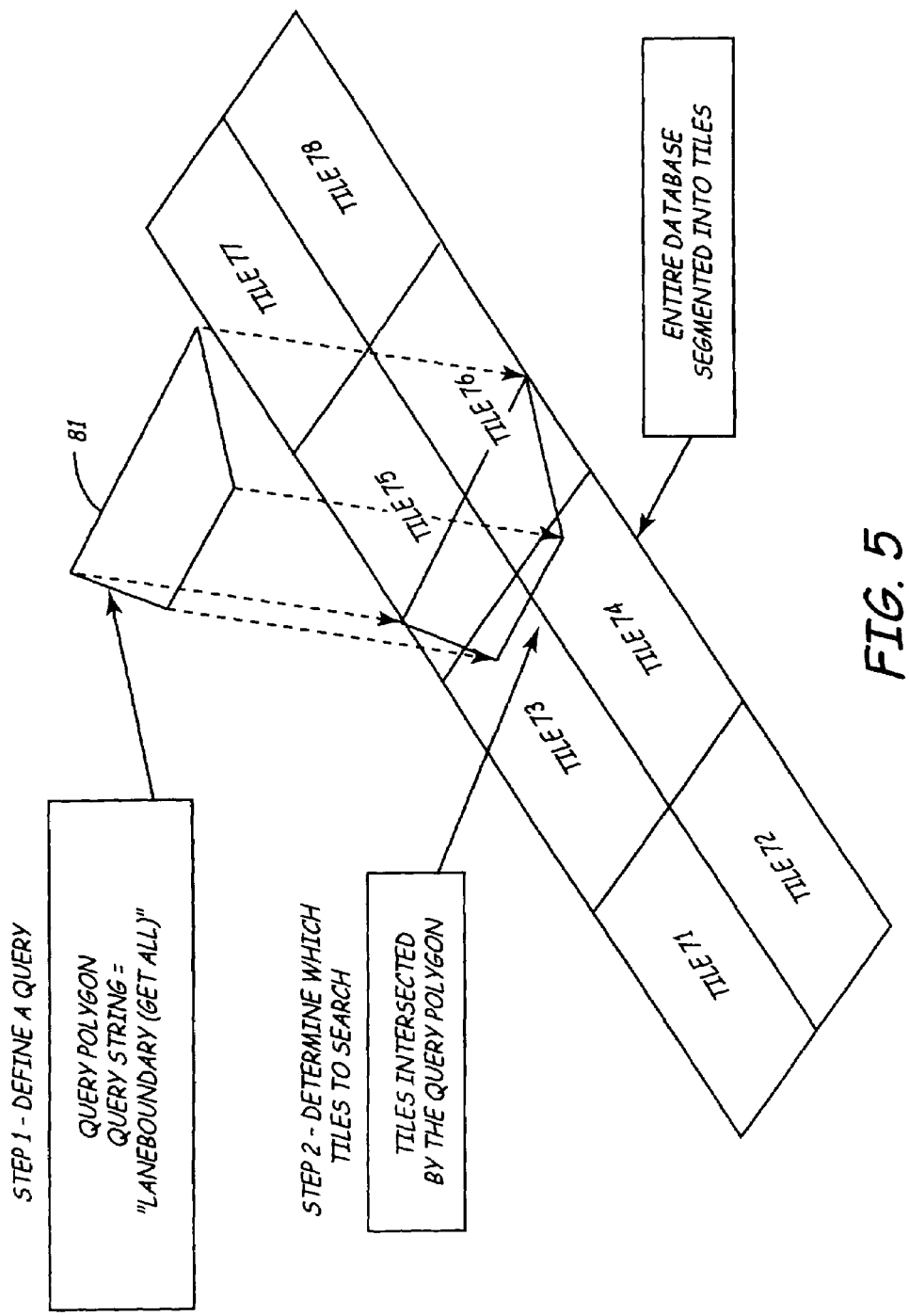
FIG. 5 illustrates the intersection of a query polygon with tiles in a database in accordance with one embodiment of the present invention.
Figure 6:
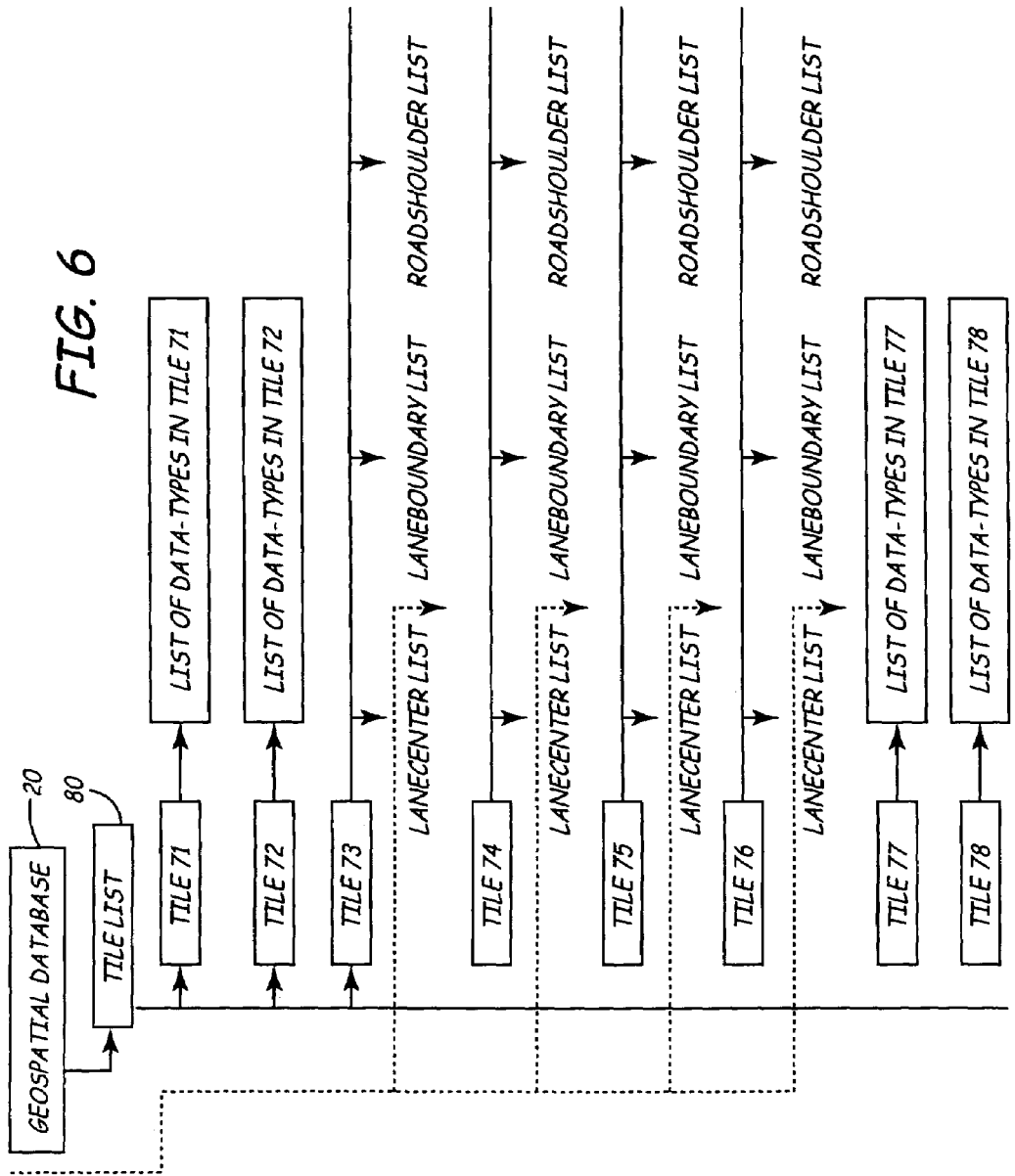
FIG. 6 illustrates searching identified tiles for specified and intersecting objects in accordance with one embodiment of the present invention.

FIG. 4 will now be described in conjunction with FIGS. 5 and 6. The dashed lines in FIG. 6 indicate possible search routes. FIG. 5 illustrates a first portion of the query processing.

Database manager 22 maintains the database by subdividing it into tiles, or buckets, such as tiles 71-78 illustrated in FIG. 5. Of course, database 20 will illustratively be divided into a very large number of tiles and only 8 are shown in FIG. 5 for the sake of simplicity. A tile is the smallest portion of the database that can be dynamically loaded or unloaded to extend the database as needed at run time. The tiles are listed in a tile list, such as list 80 shown in FIG. 6. Tile list 80 includes a list of the tiles, and their associated spatial boundaries (the spatial or geographic area which they cover).

Within each of the tiles are separate homogeneous object lists. That is, each list within a tile only contains objects of the same object type. This is shown in FIG. 6, for example, as the LaneCenter list, the LaneBoundary list, and the RoadShoulder list for tile 73. In other words, the LaneCenter list lists all of the LaneCenter objects contained in, or intersecting, the geographic area defined by tile 73. The LaneBoundary list lists all of the LaneBoundary objects found in, or intersecting, the geographic area defined by tile 73 and so on.

When query processor 24 retrieves a query from the query queue, it examines the query polygon 81 defined by the particular subsystem 14 that generated the query. Recall that the query polygon 81 is a polygon of interest to the subsystem. Query processor 24 first examines tile list 80 to determine which of the tiles 71-78 the query polygon 81 intersects. This is indicated by block 82 in FIG. 4.

The method of determining whether the query polygon 81 intersects any of the tiles 71-78 is diagrammatically illustrated in FIG. 5 as well. FIG. 5 shows that query polygon 81 intersects tiles 73, 74, 75 and 76.

Once the intersecting tiles have been identified, query processor 24 then queries the intersecting tiles 73-76 by identifying object lists in the intersecting tiles that contain object types specified by the object list in the query 16 generated by the subsystem 14. This is indicated by block 84 in FIG. 4. In one example, query processor 24 identifies the tiles that contain desired objects by simply doing a string compare between the object list in the query 16 and the objects in the intersecting tiles. This is indicated by block 85 in FIG. 4.

Once query processor 24 has identified objects within an intersecting tile that meet the attributes specified in the query 16, query processor 24 then determines whether any of those specific objects intersect with the query polygon 81. This is indicated by block 86 in FIG. 4.

Having now identified particular objects which not only intersect the query polygon 81, but which are also desired object types (desired by the subsystem 14 that generated the query 16) query processor 24 tabulates the results and passes them back to database manager 22. Database manager 22, in turn, passes query results 18 back to the subsystem 14 for processing by that subsystem. This is indicated by block 86 in FIG. 4.

It can be seen that the present invention only needs to do a small number of initial intersection calculations in determining which tiles intersect the query polygon. This yields lists of objects in the same general vicinity as the query polygon. Then, by doing a simple string compare against the object lists, the present system identifies objects of interest in the same general vicinity as the query polygon before doing intersection computations on any of the individual objects. Thus, the intersection computations are only performed for objects of interest that have already been identified as being close to the query polygon. This drastically reduces the number of intersection computations which are required. This greatly enhances the processing speed used in identifying intersecting objects having desired object types.

In one illustrative embodiment, the operation of the database manager 22 and query processor 24 was programmed in the C computer language with function calls simplified by using only pointers as illustrated with respect to FIG. 3, such that no large structures or arrays are passed through the functions. The specific query processing routines are known and are taught, for example, in Computational Geometry In C, written by Joseph O'Rourke, Cambridge University Press, Second Edition, September 1998. The main processing routines are point-in-polygon and line-line intersection routines. In the routines, a line-string intersects a polygon if any of the line-string's points are contained within the polygon, or if any segment of the line-string, defined by two consecutive points, intersects any edge of the polygon. The polygon-polygon intersection is the same as a line-string-polygon intersection. An arc-segment is treated as if it were a line-string. Even though an arc-segment can be described by its radius, start and end points, within a database it is represented as having interior points for query processing.

In order to further enhance the speed of the query process, no clipping or merging is performed on the results. Objects that intersect the query polygon are returned whole. Although the preferred embodiment makes no attempt to return only the part of the object that is within the query polygon, or merge together similar objects, this could be done in other embodiments given fast enough processors or adequate time.

The size or shape of the tiles within geospatial database 20 can vary with application. In general, smaller tile sizes produce a larger number of objects, but with a smaller average number of objects per tile. Also, larger tiles have a smaller number of objects but a larger average number of objects per tile. It has been observed that, as tile size increases, query times to the database also increase. This increase in query time is due to the fact that larger tiles contain more objects and during query processing, all relevant objects must be checked against the query polygon. It is also observed that the query time begins to increase again as the tile size is reduced below approximately 1000 square meters. The increase in query time as the tile size decreases is from the overhead of handling more tiles. As the tile size decreases, the number of tiles that intersect the query polygon increases. It was observed that, for the head up display and target filter subsystems, the minimum mean query time was observed for tiles being 1000 square meters. For the virtual rumble strip, the database having tiles of 2000 square meters performed best. However, it is believed that optimum tile size in the database will be between approximately 500-6000 square meters, and may illustratively be between 500-4000 square meters and may still further be between 500-2000 square meters and may be approximately 1000 square meters to obtain a best overall performance.

It has also been observed that increasing the size of a query polygon does not significantly affect the time to process that query. Thus, as query processing needs to be reduced to free up processing time, the query polygon may be increased in size with little effect in query processing time.

It should also be noted that tile size in the present invention can be varied based on information density. In other words, in rural areas, there are very few items contained in the geospatial database, other than road boundaries and center lines. However, in urban areas, there may be a wide variety of center islands, curbs, and other objects that must be contained in the geospatial database at a greater density. In that case, the database can be tiled based on content (e.g., based on the amount of objects on the road).

It should also be noted that a known algorithm (the Douglas-Peucker Algorithm set out in D. Douglas and P. Peucker, Algorithms for the Reduction of the Number of Points Required to Represent a Digitized Line or Its Character, the Canadian Cartographer, 10(2):112-122, Dec. 1973) was used to remove unwanted vertices from a list of points within a given tolerance.

Further, the tiles or buckets described herein are but one exemplary way to aggregate data in space. For example, a quadtree system can be used as well, which recursively subdivides space. Other known techniques can also be used.

The exemplary database management system can return query results using real time processing. Thus, the system can provide an output (query results) to subsystems for collision detection and for lane-level guidance in real time. By "real time" it is meant that the query must be returned in sufficient time to adequately operate the host vehicle on which it is contained. In one illustrative embodiment, such as an automobile, real time requires query processing (i.e., returning the query results from the time the query was received) to occur in less than 0.1 seconds (100 milliseconds) and 50 ms may be even more desirable. The exemplary system has been observed to return query results, no worse than a time of approximately 12 milliseconds, well below the numbers above.

Highly detailed and accurate digital road databases are needed for advanced driver assistive systems such as head-up displays, and lane departure warning systems and other subsystems discussed above. All major public roads have lane markings applied to them on a regular basis. The location of the lane markers is one of the most important 'pieces' of information about the road required by drivers to drive safely. Therefore, a road database must contain the digital objects that represent the accurate location of the applied lane markings that define the lanes within the road. None of the currently available digital maps or databases contain this information, because no one collects this type of information. Photogrammetric methods using aircraft, and including LIDAR systems (laser based ranging systems), are significantly more expensive than the present invention and require significant post-processing of the results.

The applied lane markings are key to how a driver maintains lateral position on the road. Without lane markings, drivers may make inappropriate judgements about their lateral position on the road. Other road related information, such as the location of the road shoulder, traffic islands, or "road furniture", are also important to safety (and also to transportation asset management systems needed to manage and maintain these objects) and should also be contained within the same road database.

Therefore, the present invention focuses on the capture and storage of the geospatial relationships that represent features on, or adjacent to, the road that are important for safe driving and collision avoidance.

The present invention can be implemented in any of a variety of ways, and will be described herein with respect to three exemplary embodiments which facilitate the creation of digital road databases; two methods of road geometry digitization, and an additional method of digitizing "road furniture". Of course, others can be used. One embodiment uses the typical paint striping (or tape laying or other lane marking application technique) machine to digitize the lane markings as the lane markings are applied or re-applied to the road surface. Such machines have one or more applicators to apply paint, tape, or other lane markers to the road surface. A second embodiment digitizes the existing lane markings (and other relevant road geometry), using a digital camera and real time image processing software. Another embodiment uses scanning range sensors and object recognition software to simultaneously capture and accurately digitize stationary "road furniture" adjacent to the road, such as signs and guard rails. This system can be used alone or together with either or both of the other two embodiments.

While a variety of positioning systems could be used, all three embodiments described herein use high accuracy (on the order of centimeters) differential GPS as a reference when digitizing the road geometry. Differential GPS, or DGPS, is a real time method of continuously (with delays less than 2 seconds) correcting for errors arising from signal distortions due to the transmission of signals through the ionosphere and troposphere, errors arising from satellite orbital errors and errors arising from the errors of the satellite's atomic clock. Such DGPS systems typically use what is called a dual frequency GPS receiver, which has been commercially available since 1999. Of course, in the future, such corrections may not be needed, because technology on new satellites or in the receivers may allow the acquisition of sufficiently accurate position data.

In any case, using current technology, corrections may be made based on several available approaches, which are not intended to limit the present invention. Approaches include locally fixed GPS receivers that measure errors directly and broadcast them locally, or systems that calculate local errors based on information received from a network of GPS receivers and then compute a network wide correction before transmitting the locally valid corrections (via ground based transmitter or satellite based transmission). This latter approach reduces the number of fixed receivers that are needed to determine the corrections.

The use of DGPS as a reference signal, along with real time data collection and processing, allows each system to collect data in real time as the vehicle travels along the road. The present invention produces a highly detailed and spatially accurate digital representation of the lane markings, or other road geometry, in a global or local coordinate system. Embodiments of the present invention yield results which can create or augment existing digital maps containing road networks. All three embodiments described herein can be independent of each other, but can be used simultaneously on the same vehicle with a single DGPS unit as a reference.

Figure 7:
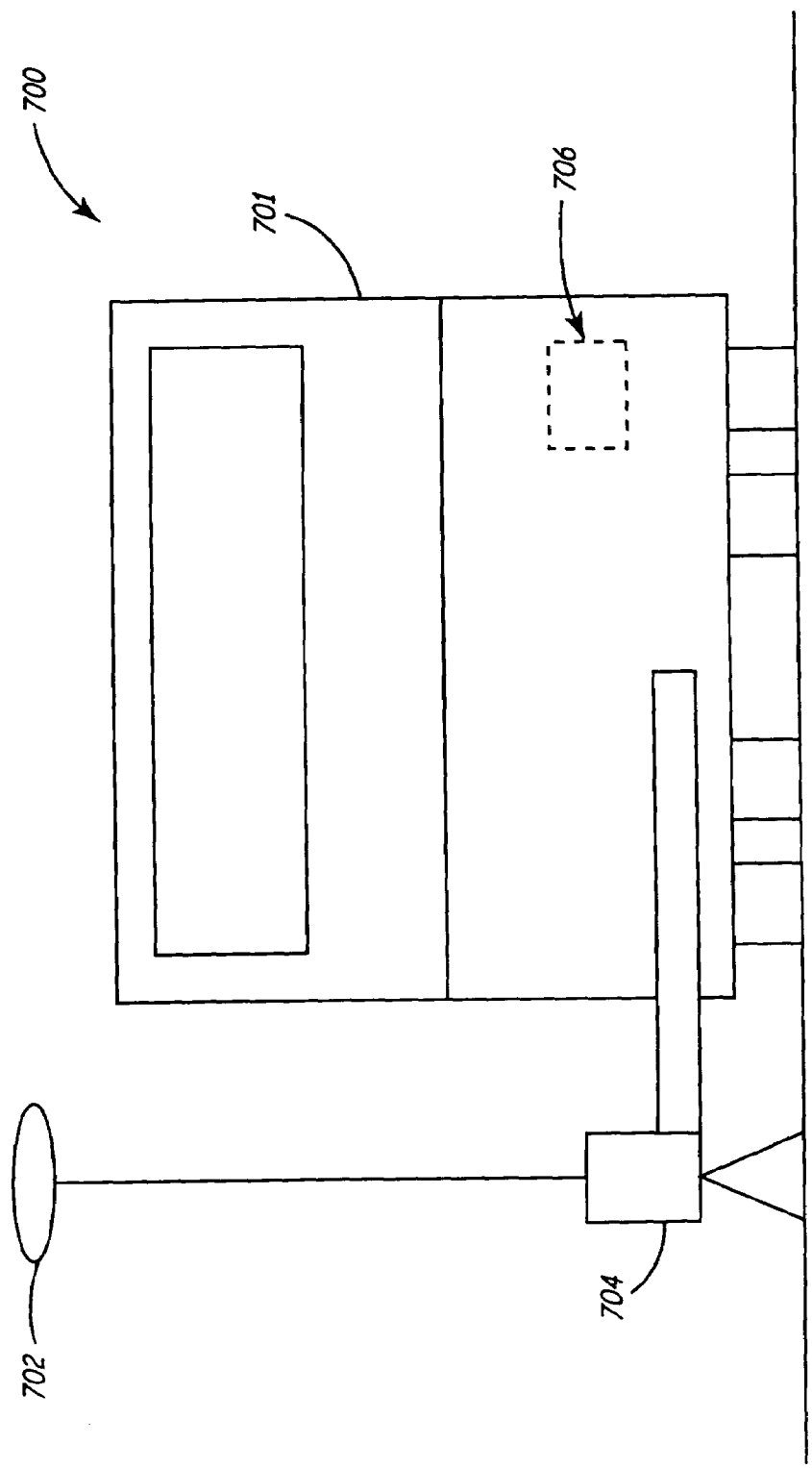
FIG. 7 illustrates a host vehicle having a DGPS antenna mounted directly on a paint spray head in accordance with one embodiment of the present invention.

A first embodiment illustrated in FIG. 7, uses a paint striping machine 700, and is highly suitable for database creation because paint striping machine 700 actually paints the lane markings on the road and is used to repaint sections on a regular basis. Machine 700 is illustratively a vehicle 701 with a DGPS antenna 702, a paint stripping nozzle 704 and a DGPS receiver 706. Vehicle 701 travels along the road activating spray 704 intermittently to paint stripes on the road. By using such machines, one can capture the location of the lane marking directly. This produces high accuracy data that can be frequently updated with relatively little additional expense. The latest paint striping machines 700 can cost so much that the expense of additional road digitizing instrumentation on such machines is relatively small.

One method of data collection using paint striping machine 700 is to mount DGPS antenna 702 directly above spray head (or nozzle) 704, as seen in FIG. 7. DGPS antenna 702 is placed high enough that signals received from satellites in the sky are not obstructed by the cab of paint striping machine 700 and that DGPS antenna 702 has a clear "view" of the sky. As spray head 704, or the entire vehicle 701 moves, the position determined by DGPS receiver 706 will correspond to the applied paint stripe, given the addition of a correction to account for any lateral and vertical displacement of the antenna from the paint spraying nozzle 704 and height offset of the nozzle from the road surface.

Figure 8:
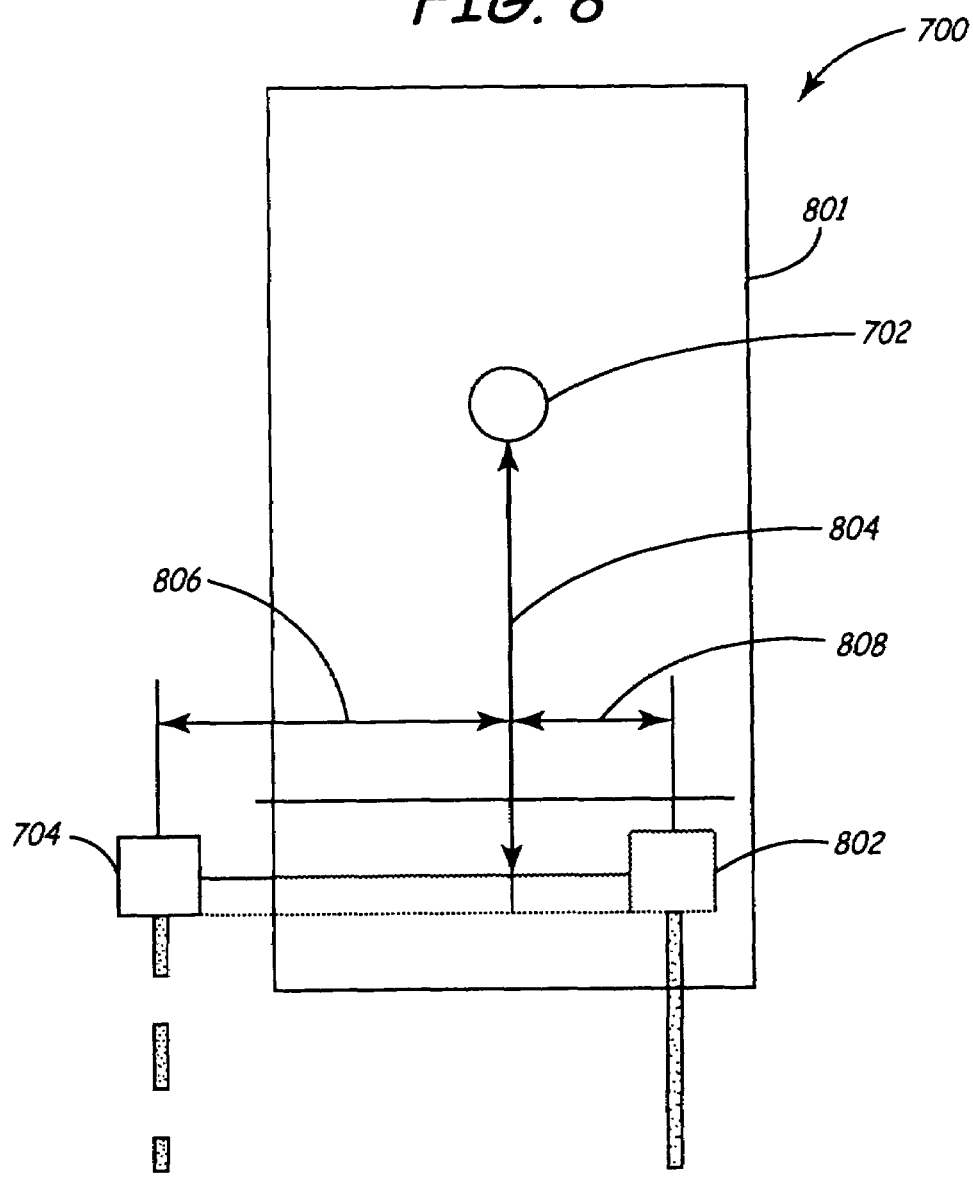
FIG. 8 illustrates a host vehicle having multiple spray heads with a single DGPS unit in accordance with one embodiment of the present invention.

However, this embodiment of the present invention may not be most desired for some circumstances. Some paint striper machines mount the spray heads 704 underneath a control booth at the rear of the machine, which makes mounting a DPGS antenna 702 above the spray head 704 unfeasible. Also, it can be advantageous to use a single DGPS unit as a reference for multiple spray heads 704 in simultaneous use. FIG. 8. illustrates an embodiment utilizing multiple spray heads 704 and 802 with a single DPGS unit 702. FIG. 8 is a top view of vehicle 801. Note that the embodiment includes dual spray heads, 704 and 802, and DGPS antenna 702.

When DGPS antenna 702 is not directly attached to spray head 704, the location of spray head 704 relative to DGPS antenna 702 must be known at all times in order to correctly locate the paint stripes. Linear and angular measuring devices measure the location of spray head 704 to a fixed position on paint striping machine 700. The relative position of spray head 704 to the DGPS antenna 702 can be calculated, given that the relative positions of the DGPS antenna 702 and spray head 704 are known. Distance 804 is the distance spray heads 704 and 802 are from DGPS antenna 702. Distance 806 is the distance spray head 704 is outboard from DGPS antenna 702. Distance 808 is the outboard distance for spray head 802. Of course, the location measurement for spray heads 704 or 802 can be dynamic, the measurement being updated in real time as the operator moves the spray heads 704 or 802 to paint at different heights or inboard/outboard offsets.

Figure 9:
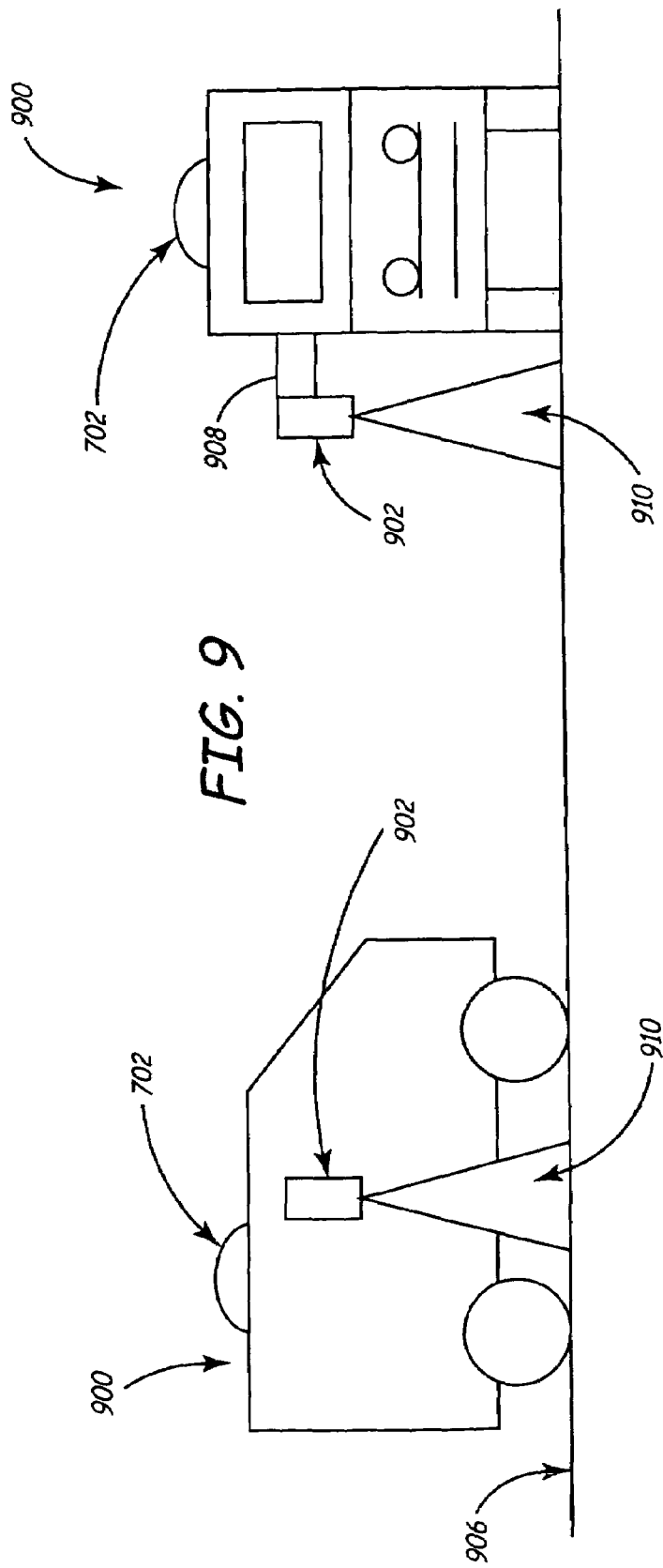
FIG. 9 illustrates a host vehicle digitizing lane markings in accordance with one embodiment of the present invention.

A second embodiment of the present invention is shown in FIG. 9 and is a method and system for digitizing lane markings and uses a digital camera 902 and image processing software. A digital camera, which may be an infrared-sensitive digital camera, 902 is mounted on a vehicle 900 at a known location relative to the DGPS antenna 702, looking down at pavement 906. The camera mount design and the camera's field of view 910 are such that the lane marking or pavement 906 is in the camera's field of view 910. Digital camera 902 illustratively has a wide enough field of view 910 that the driver need not worry about maintaining a highly accurate position over the paint stripe while driving vehicle 900. Image processing software then finds and digitizes any and all of the lane markings "seen" within the continuous image frames taken by digital camera 902. The position of the lane markings is determined given dimensions and calibration parameters of the camera pixels relative to lateral distance on the road surface and the position of digital camera 902 relative to DGPS antenna 702.

A third embodiment of the invention, is an additional process that can be added to either or both of the two previous methods. This technique is used to digitize the "road furniture" and the pavement edge and curbs. This embodiment is described with reference to FIG. 10 and references all measurements to DGPS antenna 702 installed on vehicle 1000.

Figure 10:
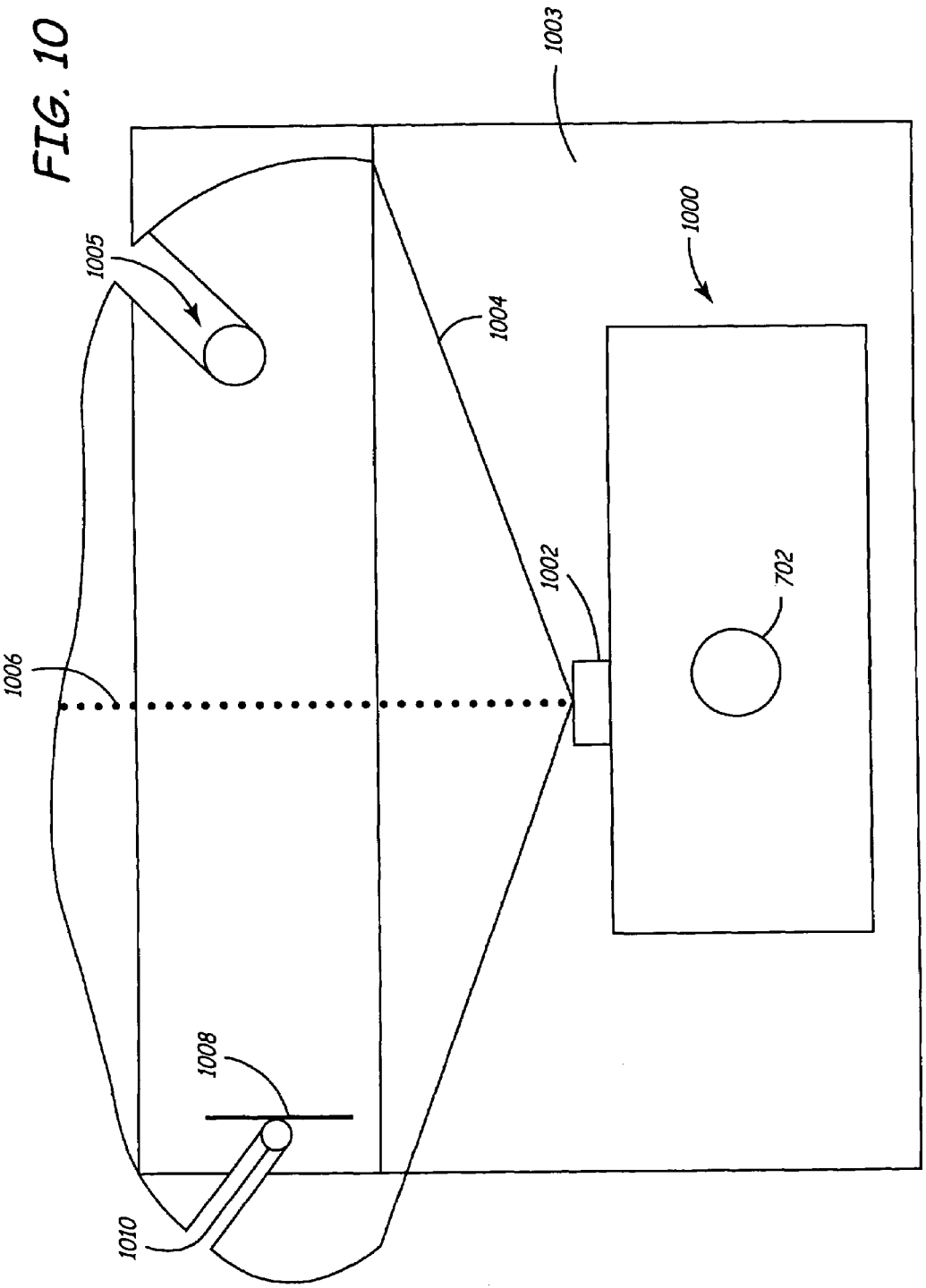
FIG. 10 is a top view of a host vehicle digitizing "road furniture" and road geometry using scanning range sensors on a moving vehicle in accordance with one embodiment of the present invention.

FIG. 10 shows vehicle 1000 on a roadway 1003 adjacent to a plurality of objects (such as posts 1005 and 1010). Object detection is performed by a single or multiple scanning range sensors 1002, such as laser range finders or LIDAR, that are scanning to either or both sides of the vehicle 1000 as the vehicle moves. As range sensor 1002 scans an area, sensor analysis software creates a profile of the distances from the sensor to the objects in its field. This profile can be stored and processed to find recognizable objects (based on known templates, for example), or simply to record 'objects' that are close to the road and that might be dangerous (even if they are unidentifiable and labeled as unknown, this is described in greater detail with respect to FIGS. 10, 11, and 12). Using object recognition and pattern matching algorithms within the sensor analysis software, the "road furniture" can be detected and digitized from a single scan, or multiple scans, of range sensor(s) 1002. Range sensors 1002 can scan along a vertical plane or horizontal plane, or both. The illustrative embodiment is to use both a horizontal scan 1004 and vertical scan 1006. This process can be implemented simultaneously with the digitization of the road (i.e. lane markings) as in either of the other two embodiments.

Figure 11:
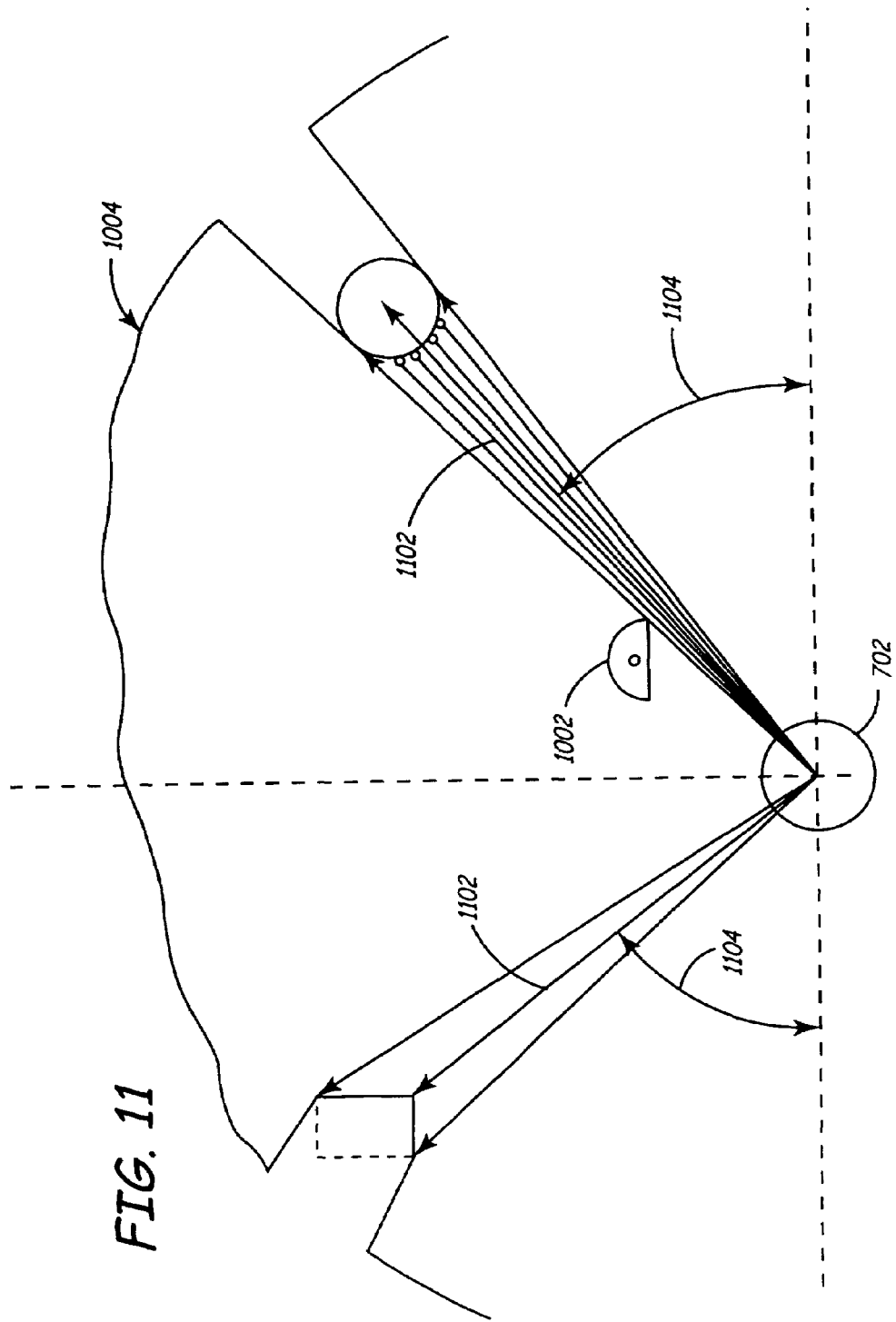
FIG. 11 illustrates the horizontal scan results from FIG. 10 in accordance with one embodiment of the present invention.

It is important to note that FIGS. 10, 11, and 12 each represent a single moment in time. As the vehicle travels down the road, it collects many such moments. One function of the sensor analysis software is to link these moments together into a representation of the road and its surroundings.

FIG. 10. illustrates digitizing "road furniture" and road geometry using scanning range sensors 1002 on a moving vehicle 1000 (top view). Note that in this cross-section, horizontal scanning plane 1004 is below traffic sign 1008, but still captures post 1010 that supports sign 1008. There may be more than one scanning range sensor 1002 on each vehicle 1000. Thus, vertical scan 1006 picks up the sign 1008 as vehicle 1000 passes sign 1008. Road furniture 1005 is captured in the same scan.

FIG. 11. illustrates the horizontal scan 1004 results at one instant in time of FIG. 10 (vehicle not shown). Note that the measured distances 1102 and angles 1104 from the reference point of DGPS antenna 702 are all detected from the signal from the scanning sensors 1002. Objects in field have different shapes. Scans provide data on object shape and, from the shape/profile, the object reference location is determined as distance 1102 and angle 1104.

FIG. 12. illustrates scan results from the vertical scan plane 1006 shown in FIG. 10. FIG. 12 depicts a front or rear view of vehicle 1000 as it moves along the road (into or out of the page). Note that distance 1202 and angle 1204 measured with reference to DGPS antenna 702 are all detectable from the signal from sensors 1002.

It can be seen from the above discussion that it may be most cost effective to use a paint striping machine 700 or the machine that applies lane markings (using other marking materials such as tape) for road data collection. This eliminates the need to have an additional vehicle passing over the road at a later date to collect the data. Furthermore, the same data can be used to help guide or automate the lane marking system when it re-applies the lane marking. However, the second embodiment of capturing data may be desired when a geospatial database is needed and lane markings are already located on the road or when a lane marking machine is not available. In this case, the road data collection instruments may be attached to any vehicle traveling the road.

To further describe aspects of the present invention, FIG. 13 is a block diagram of one embodiment of a system for high accuracy road infrastructure digitization for use in high accuracy digital geospatial databases of roads in accordance with one embodiment of the present invention. A system 1300 includes a geospatial database 20, a database manager 22, and a database developer 1302. Database developer 1302 is attached, directly or indirectly, to a plurality of sensors including DGPS receiver 702, digital camera 902, and/or scanning range sensor 1002. Database developer 1302 uses data from the plurality of sensors to augment or update geospatial database 20. Database manager 22 can also be attached to other sensors 1310 or a Driver Assist Subsystem which is not a component of the system in this embodiment of the invention.

Although the present invention has been described with reference to preferred embodiments, workers skilled in the art will recognize that changes may be made in form and detail without departing from the spirit and scope of the invention.

Two additional applications for the exemplary system will be mentioned at this time. These methods may be used alone or in combination with each other.

Another application of the geospatial database is a road user charging system, where location in a particular lane is charged at a higher or lower rate depending on the time and location of the vehicle, or the type of vehicle.

Yet another application is road user management system in which a transportation department or other agency maintains accurate and timely data on all roads and objects located adjacent to the roads (such as signs, light poles, guard rails, traffic signals, etc.) as to their quality, time of construction, reflectivity or markings and signs, quality of pavement such as cracks, nature of signs, etc.

What is claimed is:

1. A geospatial database generation system (GDGS), mounted on a host vehicle, generating geospatial data relating to travel paths having one or more lanes, comprising:
    a database developer component including a lane level data system configured to receive sensor inputs from a plurality of sensors mounted on the host vehicle including a location sensor input indicating a location of the host vehicle in three-dimensional space, and to develop data elements in the geospatial database based on the inputs, the data elements being indicative of objects and a location of the objects in three dimensional space, the objects having a lane-level resolution, wherein the plurality of sensors includes an object sensor configured to sense an object, and wherein the database developer component is configured to generate the data elements from the sensor inputs from the plurality of sensors as data objects having an attribute portion and a spatial data portion, the attribute portion including attributes indicative of the data object and the spatial data portion including data indicative of the location of the object in three dimensional space.

2. The GDGS of claim 1, wherein the lane level data system generates the data elements such that the location has an accuracy of at least one decimeter.

3. The GDGS of claim 1, further comprising a Differential GPS (DGPS) receiver configured to generate the location sensor input.

4. The GDGS of claim 1, wherein the host vehicle is a lane marking machine configured to mark the one or more lanes along the travel path.

5. The GDGS of claim 4, wherein the lane marking machine has an applicator device that applies a marking material to mark the one or more lanes.

6. The GDGS of claim 5, wherein the object sensor includes an actuation sensor sensing actuation of the applicator device.

7. The GDGS of claim 5, wherein the location sensor is mounted on the applicator device to sense a location of the applicator device in three dimensional space.

8. The GDGS of claim 5, wherein the lane marking machine has a plurality of applicator devices that apply marking material at a plurality of locations along the travel path.

9. The GDGS of claim 8, location sensor further comprising a plurality of location sensors each mounted on one of the applicator devices.

10. The GDGS of claim 1, wherein the object sensor includes a digital camera.

11. The GDGS of claim 1, wherein the object sensor includes a scanning range sensor.

12. The GDGS of claim 1, further comprising a location sensor configured to generate the location sensor input, wherein the location sensor is spatially offset from the object sensor and wherein the database developer accounts for the offset in generating the data elements.

13. The GDGS of claim 1, wherein the plurality of sensors includes a plurality of object sensors for sensing objects.

14. The GDGS of claim 1, wherein the sensor inputs include a LaneBoundary object representative of a roadway lane boundary.

15. The GDGS of claim 1, wherein the sensor inputs include a RoadShoulder object representative of a roadway shoulder.

16. The GDGS of claim 1, wherein the sensor inputs include a RoadIsland object representative of a roadway island.

17. The GDGS of claim 1, wherein the sensor inputs include a LaneCenter object representative of a roadway lane center.

18. The GDGS of claim 1, wherein the sensor inputs include objects representative of structures adjacent to the travel paths.

19. The GDGS of claim 18, wherein the sensor inputs are representative of one or more of mailboxes, jersey barriers, guard rails, bridge abutments, tunnel walls, ground plane and ceiling, curbs, curb cutouts, fire hydrants, light posts, traffic signal posts, sign and sign posts, pavement edge, drop-off, and other of the structures adjacent to the travel paths.

20. The GDGS of claim 1, wherein one or more of the sensor inputs are calculated from one or more other of the sensor inputs.

21. A geospatial database generation system (GDGS), mounted on a host vehicle, generating geospatial data relating to travel paths having one or more lanes, comprising:
    a database developer component including a lane level data system configured to receive sensor inputs from a plurality of sensors mounted on the host vehicle including a location sensor input from a location sensor indicating a location of the host vehicle in three-dimensional space, and to develop data elements in the geospatial database based on the inputs, the data elements being indicative of objects and a location of the objects in thee dimensional space, the objects having a lane-level resolution, wherein the plurality of sensors includes an object sensor configured to sense an object, and wherein the location sensor is spatially offset from the object sensor and wherein the database developer accounts for the offset in generating the data elements.

22. The GDGS of claim 21, wherein the host vehicle is a lane marking machine configured to mark the one or more lanes along the travel path.

23. The GDGS of claim 21, wherein the object sensor includes a digital camera.

24. The GDGS of claim 21, wherein the object sensor includes a scanning range sensor.

25. The GDGS of claim 21, wherein the database developer component is configured to generate the data elements from the sensor inputs from the plurality of sensors as data objects having an attribute portion and a spatial data portion, the attribute portion including attributes indicative of the data object and the spatial data portion including data indicative of the location of the object in three dimensional space.

26. The GDGS of claim 25, wherein the sensor inputs include a LaneBoundary object representative of a roadway lane boundary.

27. The GDGS of claim 25, wherein the sensor inputs include a LaneCenter object representative of a roadway lane center.

28. The GDGS of claim 25, wherein the sensor inputs include objects representative of structures adjacent to the travel paths.

29. A geospatial database generation system (GDGS), mounted on a host vehicle, generating geospatial data relating to travel paths having one or more lanes, comprising:
    a database developer component including a lane level data system configured to receive sensor inputs from a plurality of sensors mounted on the host vehicle including a location sensor input from a location sensor indicating a location of the host vehicle in three-dimensional space, and to develop data elements in the geospatial database based on the inputs, the data elements being indicative of objects and a location of the objects in three dimensional space, the objects having a lane-level resolution, wherein the plurality of sensors includes an object sensor configured to sense an object, and wherein the database developer component is configured to generate the data elements from the sensor inputs from the plurality of sensors as data objects having an attribute portion and a spatial data portion, the attribute portion including attributes indicative of the data object and the spatial data portion including data indicative of the location of the object in three dimensional space.

30. The GDGS of claim 29, wherein the host vehicle is a lane marking machine configured to mark the one or more lanes along the travel path.

31. The GDGS of claim 29, wherein the object sensor includes a digital camera.

32. The GDGS of claim 29, wherein the object sensor includes a scanning range sensor.

33. The GDGS of claim 29, wherein the location sensor is spatially offset from the object sensor and wherein the database developer accounts for the offset in generating the data elements.

34. The GDGS of claim 29, wherein the sensor inputs include a LaneBoundary object representative of a roadway lane boundary.

35. The GDGS of claim 29, wherein the sensor inputs include a LaneCenter object representative of a roadway lane center.

* * * * *